June 13, 1939. J. B. KESSEL 2,161,867
AGITATOR FOR FOOD MIXERS
Filed Feb. 8, 1937
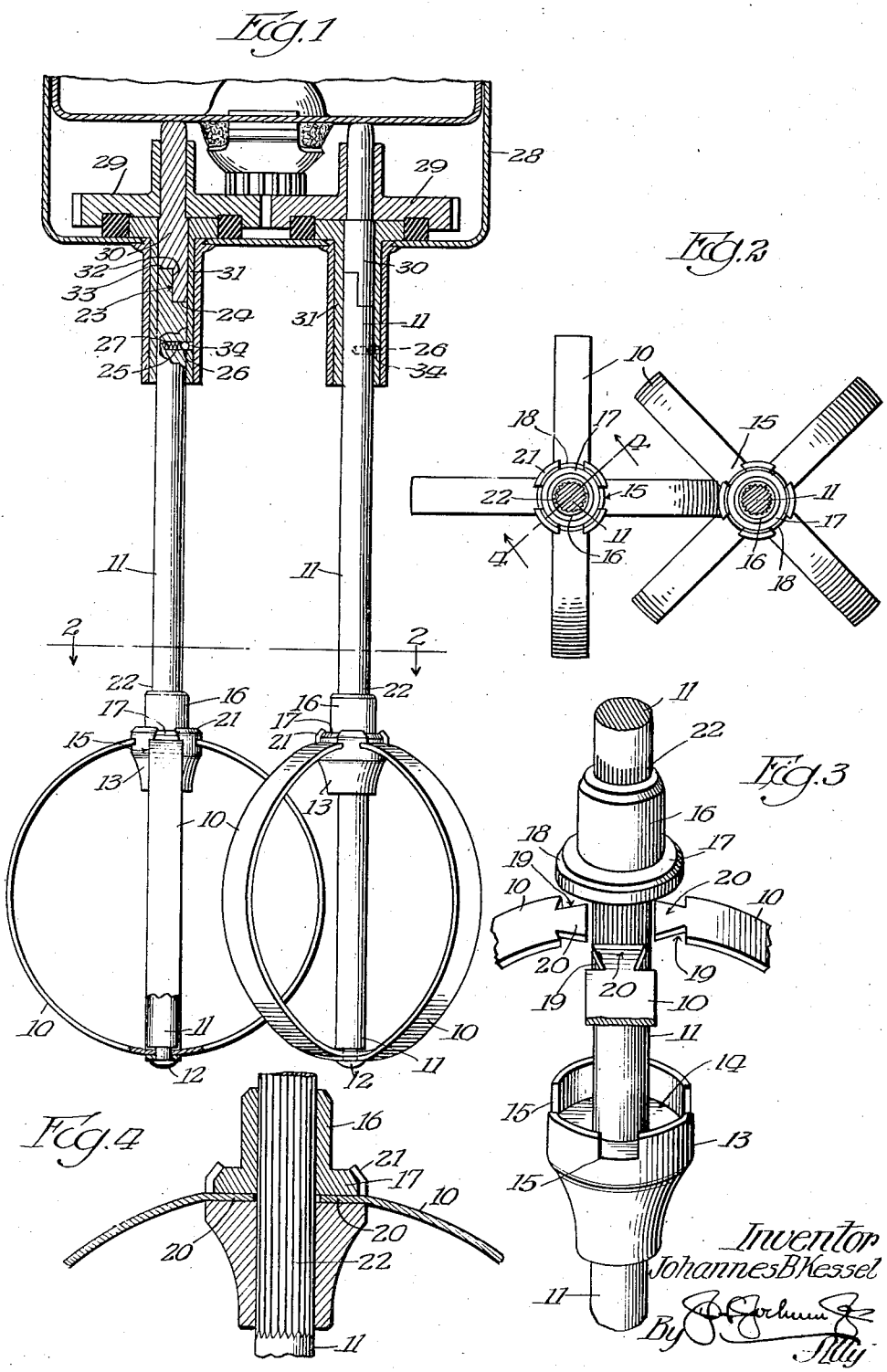
Inventor
Johannes B Kessel Patented June 13, 1939

2,161,867

UNITED STATES PATENT OFFICE 2,161,867

AGITATOR FOR FOOD MIXERS

Johannes B. Kessel, Chicago, Ill., assignor to Chicago Flexible Shaft Company, Chicago, Ill., a corporation of Illinois Application February 8, 1937, Serial No. 124,567

4 Claims. (Cl. 259—131)

This invention relates in general to food mixers, but more specifically it relates to improvements in agitators, particularly adapted, though not necessarily limited in its use in such apparatus, and one of the objects of the invention is to provide an improved form of agitator or beater which will be of a sturdy construction, cheap to manufacture, and effective and efficient in operation, and in which the parts will not become loose, but will remain securely fastened in position.

To the attainment of these ends and the accomplishment of other new and useful objects as will appear, the invention consists in the features of novelty in substantially the construction, combination and arrangement of the several parts, hereinafter more fully described and claimed and shown in the accompanying drawing illustrating this invention, and in which Figure 1 is a view partly in elevation, partly in section and partly broken away of a plurality of agitators constructed in accordance with the principles of this invention, and showing the same in connection with a portion of an actuating mechanism.

Figure 2 is a detail sectional view taken on line 2—2, Figure 1.

Figure 3 is a detail perspective view of a portion of an agitator shaft with portions of the agitator shown in assembled relation, on an enlarged scale, and with the parts separated.

Figure 4 is a detail sectional view taken on line 4—4 Figure 2, on an enlarged scale.

The agitator consists essentially of a pair of flat flexible strips 10, constructed of any suitable material, arranged to cross each other intermediate the ends thereof and are disposed preferably at substantially right angles to each other.

These strips are secured together preferably by means of an agitator shaft 11, the lower extremity of which is preferably reduced to form a shoulder, the reduced extremity passing through registering aperture in the strips 10, and the extremity of the reduced portion is then upset to cooperate with the shoulder on the shaft for not only securing the strips together but also for securing them to the shaft 11.

The numeral 13 designates a collar of any desired size and configuration which is mounted upon the shaft 11, and before the parts are secured in assembled relation the collar is adapted for free sliding movement upon the shaft. In the upper end of the collar there is provided a seat 14 of any desired or suitable size and the wall of the recess is provided with recesses or notches 15 that open through the top of the wall and are arranged and suitably spaced circumferentially of the collar.

Mounted also upon the shaft 11 is another collar 16 which is disposed above the collar 13, and the collar 16, like the collar 13, closely fits the shaft.

The collar 16 is provided adjacent its base with a laterally projecting circumferential flange 17, of any desired width, and this flange 17 may, if desired, be provided with a beveled portion 18, the flange and the beveled portion being both adapted to telescope into the recess 14 of the collar 13.

The strips 10 are provided at their extremities with cut away portions 19, that is, the edges of the strips are cut away to form heads 20. These heads 20 may be of any desired configuration but are preferably of a dovetail shape and are of such a width and configuration as to enter the respective recesses 15 in the wall of the seat 14 of the collar 13 to be held by the edges of the notches entering the cut away portions 19.

The strips 10 are bent into substantially circular form and the heads or extremities 20 are placed within the respective recesses 15, the collar 13 having been moved to the proper position to receive such heads.

The collars 16 and 13 are then brought into closely assembled relation so that the flange 17 of the collar 16 will be telescoped into or seated within the seat 14 to clamp the extremities or headed ends 20 of the strips 10 therebetween.

This may be accomplished in any suitable manner, that is, the collar 13 or the collar 16 may be secured to the shaft 11 against movement lengthwise of the shaft and whichever collar is thus secured to the shaft, the other collar will be moved toward and into assembled relationship with the fixed collar.

After the parts have been thus assembled and the flange 17 is disposed within the seat 14 with the heads 20 of the strips 10 therebetween, a portion of the wall of the seat 14 is flanged over the flange 17, as shown more clearly at 21 in Figure 4, to firmly secure these parts in assembled relation. If the beveled portion 18 on the flange 17 is provided, the portion of the seat 14 that is flanged thereover will contact the beveled surface 18.

Any suitable means may be provided for preventing the collars 13 and 16 from moving longitudinally of the shaft 11 when the parts are in assembled relation, to maintain the strips 10 in their bowed or curved position, and also for maintaining the collars against rotation upon the shaft.

A suitable and efficient manner of accomplishing this result is to provide a series of grooves, knurling, or roughening 22 on the shaft, for any suitable distance, which is engaged by the collars, and the collars may be compressed or otherwise contracted or shaped over such portion of the shaft to firmly secure them together.

With this improved construction it will be manifest that the parts will be securely fastened together and a very inexpensive yet durable structure will be produced.

The shaft 11 may be of any desired length and the upper end thereof is cut away as at 23 to provide a flattened surface and also a shoulder 24, the latter being spaced for any desired distance from the adjacent extremity of the shaft.

Arranged within the shaft 11, preferably in proximity to the shoulder 24, is a recess 25 which opens laterally through the periphery of the shaft. Within this recess is arranged a ball or element 26 held against displacement in any suitable well known manner, such as by crimping a portion of the shaft over the element. A spring 27 tends normally to urge the element 26 forwardly so as to project beyond the periphery of the shaft. The numeral 28 designates a portion of the casing which contains driving mechanism, such as gears 29, suitably operated, and connected to each of these gears is a shaft 30 which projects into a sleeve 31 which latter may be rotatable with the gear. The sleeve 31 is of a length to project for a substantial distance beyond the extremity of the shaft 30 and the shaft 30 is cut away as at 32 to provide a shoulder 33 spaced a substantial distance from the extremity of the shaft, the cut away portion 32 also providing a flat surface.

The extremity of the shaft 11 is inserted into the sleeve 31 so that the flat surfaces 23 and 32 of the respective shafts 11 and 30 will contact while the extremities of each of the shafts will engage the shoulders 24 and 33 of the other shafts, the sleeve 31 being of an internal diameter to closely fit about the joint thus formed between the shafts.

In the wall of the sleeve 31 is provided a groove or recess 34 adapted to receive the spring pressed element 26 so that when the end of the shaft 11 is telescoped into the sleeve to form a jointed connection with the shaft 30, the shaft 11 will be detachably secured in position so that it will be rotated by and with the shaft 30.

At the same time this spring controlled element 26 serves as a means for providing a detachable connection between these parts.

While the preferred form of the invention has been herein shown and described, it is to be understood that various changes may be made in the details of construction and in the combination and arrangement of the several parts, within the scope of the claims, without departing from the spirit of this invention.

What is claimed as new is:

1. An agitator for food mixers embodying a shaft, flexible strips secured together and to said shaft, said strips having free ends and being bent into substantially circular form and thereby placed under tension, the free end of each strip being shaped to form a head, a pair of collars mounted directly upon the shaft, one of the collars having open recesses to receive said heads, the tension of said strips maintaining their respective heads against a lateral face of said recesses, the other collar being disposed in close proximity to the last said collar to maintain said heads seated, a portion of one collar being flanged over a portion of the other collar to maintain them against separation, and means for maintaining the collars against movement upon said shaft.

2. An agitator for food mixers, embodying a shaft, a metal band anchored intermediate its ends and bowed to create a tension therein, a collar secured to the shaft and provided with a seat opening through one end, the wall of said seat having recesses opening through the end thereof, the free ends of said band being headed, the said headed ends entering and seated in respective recesses, and being drawn by the tension of said band against the inner face of the wall of said seat in a direction transverse to the axis of the shaft, and a second collar having a portion entering said seat in the other collar to hold the ends of said band seated, a portion of the wall of said seat being flanged over the second said collar to secure the collars against separation.

3. An agitator for food mixers, embodying a shaft, a metal band anchored intermediate its ends to said shaft and bowed to create a tension therein, the free ends of the band being shaped to form heads, a collar secured to the shaft, one end of the collar being hollow and provided with open recesses in the wall of said hollow portion, the headed ends of said band being seated in said recesses, the walls of the recesses extending above the portion of the band that is seated therein, and a second collar on the shaft, a portion of the second collar extending into the hollow portion of the other collar and co-operating with the latter to clamp the ends of the band therebetween, portions of the wall of said hollow portion of the first said collar being flanged over a portion of the second said collar to secure them together.

4. An agitator for food mixers, embodying a shaft, a metal band anchored intermediate its ends to said shaft and bowed into shape, notches in the lateral edges of the band adjacent the free extremities thereof, a collar secured to the shaft and provided with a seat opening through the end thereof and of a depth substantially greater than the thickness of the band, the free ends of the band seated in said recesses, the side walls of the recesses entering said notches, a second collar on the shaft, a portion of the second collar entering said seat and co-operating with the other collar to clamp the free extremities of the band therebetween, and interlocking means between the collars for maintaining them against separation.

JOHANNES B. KESSEL.